UNITED STATES PATENT OFFICE.

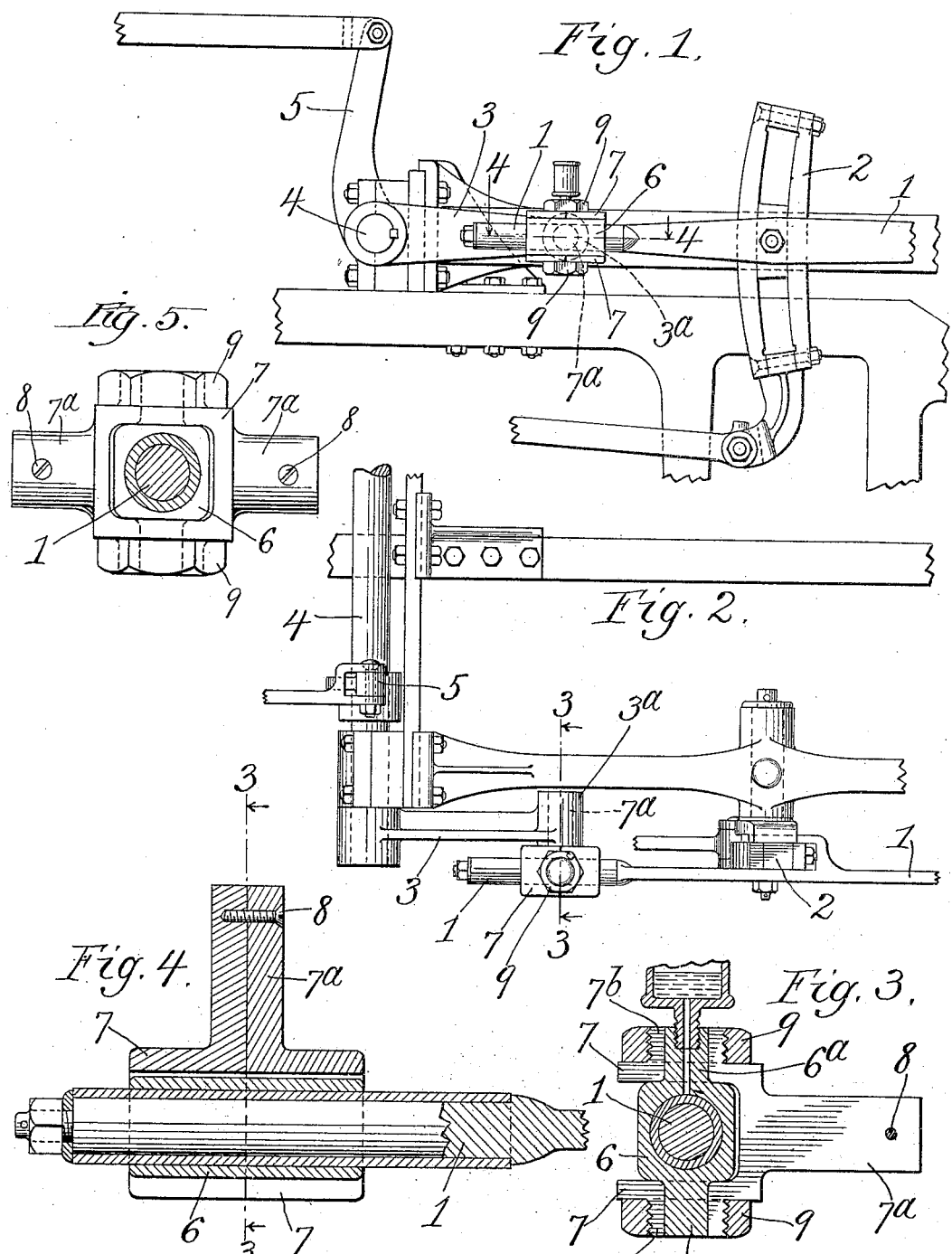

OTIS W. YOUNG, OF CHICAGO, ILLINOIS, ASSIGNOR TO YOUNG-MANN-AVERILL COMPANY, A CORPORATION OF ILLINOIS.

JOINT FOR SHIFTING MEANS FOR RADIUS-RODS.

940,224.   Specification of Letters Patent.   Patented Nov. 16, 1909.

Application filed August 12, 1908. Serial No. 448,112.

*To all whom it may concern:*

Be it known that I, OTIS W. YOUNG, a citizen of the United States, residing at Chicago, in the county of Cook and State of Illinois, have invented new and useful Improvements in Joints for Shifting Means for Radius-Rods, of which the following is a specification, reference being had to the accompanying drawings, forming a part thereof.

The purpose of this invention is to provide an improved connection between the radius rod of a locomotive and the shifting lever by which said rod is oscillated for reversing the locomotive and changing the cut-off, the improvements having in view especially the avoidance of cramping and friction in such connection, which in some previous constructions renders the control of the lever by the operator exceedingly difficult.

The invention consists in the features of construction and combinations shown and described as indicated in the claims.

In the drawings:—Figure 1 is a side elevation showing a portion of a radius rod and a reverse lever having a connection embodying this invention. Fig. 2 is a plan view of the same. Fig. 3 is a section at the line 3—3 on Figs. 2 and 4. Fig. 4 is a section at the line 4—4 on Fig. 1. Fig. 5 is a partly sectional elevation showing a modified form of the yoke of the universal joint, section being made transversely of the radius rod and bearing.

The radius rod, 1, may be understood from the drawings as being pivoted to the part which it operates at its end remote from the shifting lever, and as oscillating about that pivotal connection for shifting its pivotal connection with the Stephenson link, represented conventionally at 2. The shifting lever, 3, is the arm of a rock shaft, 4, which has a second operating arm, 5. The construction is therefore substantially that of a bell-crank lever. Said shifting lever, 3, carries a sleeve or slide bearing, 6, for the end of the radius rod. The provision for sliding is necessary to accommodate the movement of the two parts,—radius rod and lever,—in paths curved about different centers. The sleeve, 6, is necessarily pivoted to the shifting lever transversely to the plane of oscillation of the lever and rod. For this purpose there is provided a yoke, 7, which carries the sleeve and which is pivotally mounted on the lever, 3, said yoke having a long pivot stud, 7ª, taking through a suitable bearing, 3ª, on the lever for that purpose. For the mere purpose of performing the required movement under ordinary circumstances and with the parts mounted in perfectly parallel planes and with their bearings perfectly parallel, the sleeve might be rigid with the yoke; but in practice, the distortion or straining of the parts due to expansion and contraction of the entire locomotive frame and boiler and to straining and springing of the parts in service, prevents the perfect parallelism of the parts and bearings which would be necessary for proper action of the joint so constructed; and to prevent binding and cramping of the parts under the conditions of actual use, the sleeve or slide bearing, 6, is pivoted to the yoke, 7, for oscillation about an axis transverse to the pivot of the yoke to the lever, the sleeve being for this purpose provided with trunnions, 6, journaled in the bearings, 7ᵇ, of the yoke arms. In order to assemble the several members of this joint as described, the yoke is made in two parts. The yoke is parted at the axis of the pivot stud, 7ª, the parts being secured together at one end by a flush-headed bolt, 8, and at the other end by nuts, 9, 9, taking on to the split bearing, 7ᵇ, of the yoke arms.

In addition to the cramping which is prevented by the universal joint which results from the construction above described, there is liability to cramping of the radius rod in its slide bearing due to the torsional distortion of the supporting structure of the locomotive, or of the parts, and to avoid the cramping or binding of the radius rod in the slide-bearing sleeve, the rod and its seat in the bearing are made cylindrical, so that the rod has capacity not only for sliding but also for turning in said bearing. The entire joint thus affords facility for movement in every direction and prevents any possibility of binding or cramping at the joint from any distortion of the parts or of the supporting structure.

Instead of one long pivot stud, 7ª, as shown in Fig. 4, under some conditions it may be preferable to provide the yoke, 7, with two short pivot studs, 7ª, projecting from opposite sides, as shown in Fig. 5, a suitable change being made in the form of the bearing of the device in the lever arm, 3, which will be understood without further illustration or description.

I claim:—

1. In a locomotive, in combination with a shifting lever and a radius rod, a slide bearing for one of said parts which is universally jointed to the other part.

2. In a locomotive, in combination with a shifting lever and a radius rod, a member in which the rod is mounted for sliding and which is universally jointed to the lever.

3. In a locomotive, in combination with a shifting lever and a radius rod, a bearing in which the radius rod is mounted for sliding and turning, and which is universally jointed to the lever.

4. In a locomotive, in combination with a shifting lever and a radius rod, a bearing in which one of said parts is mounted for sliding, and a yoke pivoted to said bearing and to the other part, the two pivots being transverse to each other and to the slide bearing.

5. In a locomotive, in combination with a shifting lever and the radius rod, a bearing in which the rod is mounted for sliding and a yoke pivoted to said bearing and to the lever, the two pivots being transverse to each other and to the slide bearing of the rod.

6. In a locomotive, in combination with a shifting lever and the radius rod, a bearing in which one of said parts is mounted for both sliding and turning, and a member which is pivoted to said bearing and to the other part, the two pivots being transverse to each other and to the slide path of said bearing.

7. In a locomotive, in combination with a shifting lever and a radius rod, a bearing in which the rod is mounted for both sliding and turning, and a member pivoted both to the shifting lever and to said rod bearing, the two pivots being transverse to each other and to the slide path of the rod in the bearing.

In testimony whereof, I have hereunto set my hand, in the presence of two witnesses, at Chicago, Illinois, this 6th day of August, 1908.

OTIS W. YOUNG.

In the presence of—
WALTER EYERS,
M. GERTRUDE ADY.